Nov. 25, 1969
G. B. HARR
3,480,058
CONTAINER SAFETY WALL
Filed Jan. 23, 1968
2 Sheets-Sheet 1
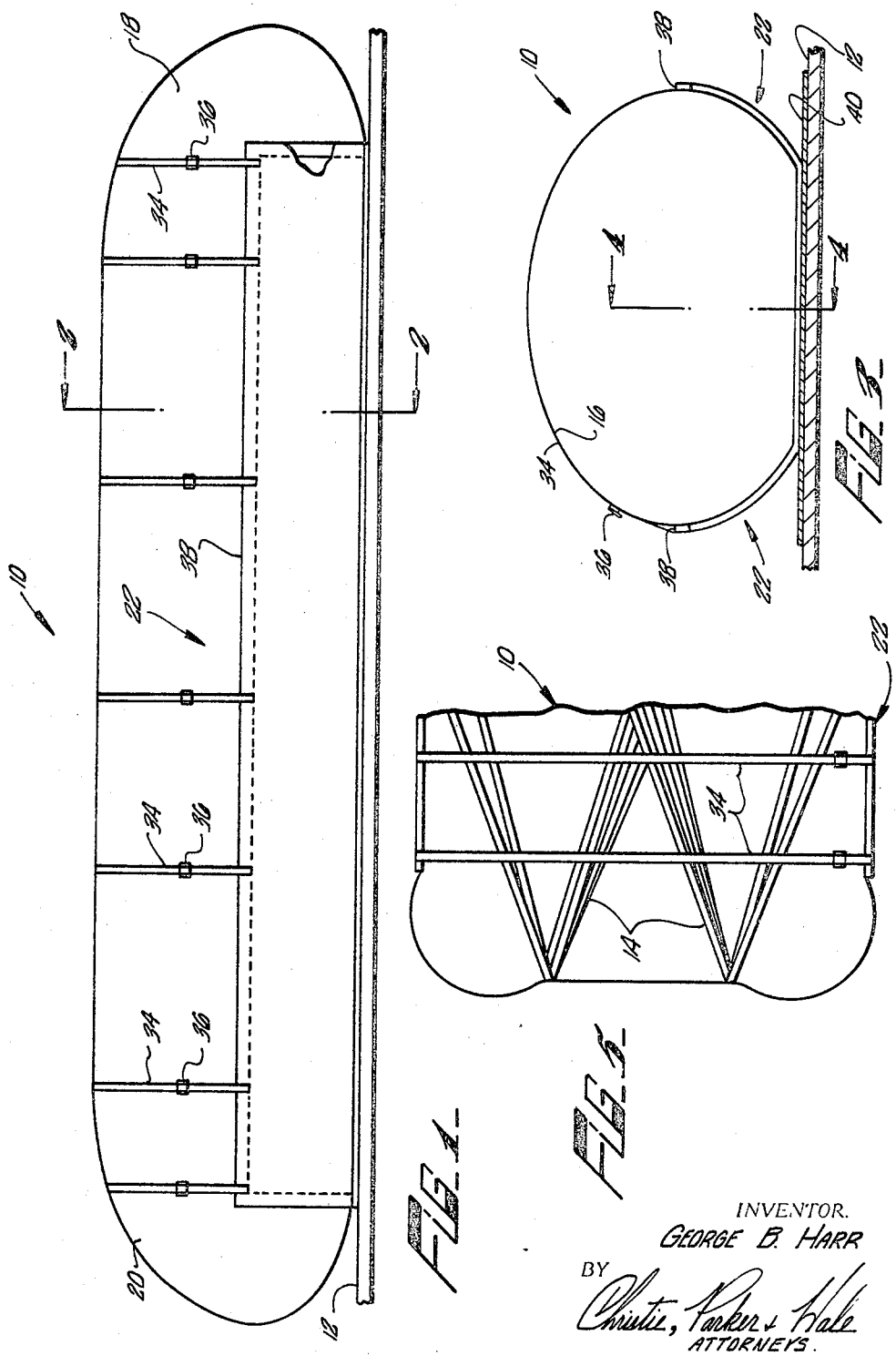
INVENTOR.
GEORGE B. HARR
BY
Christie, Parker & Hale
ATTORNEYS.

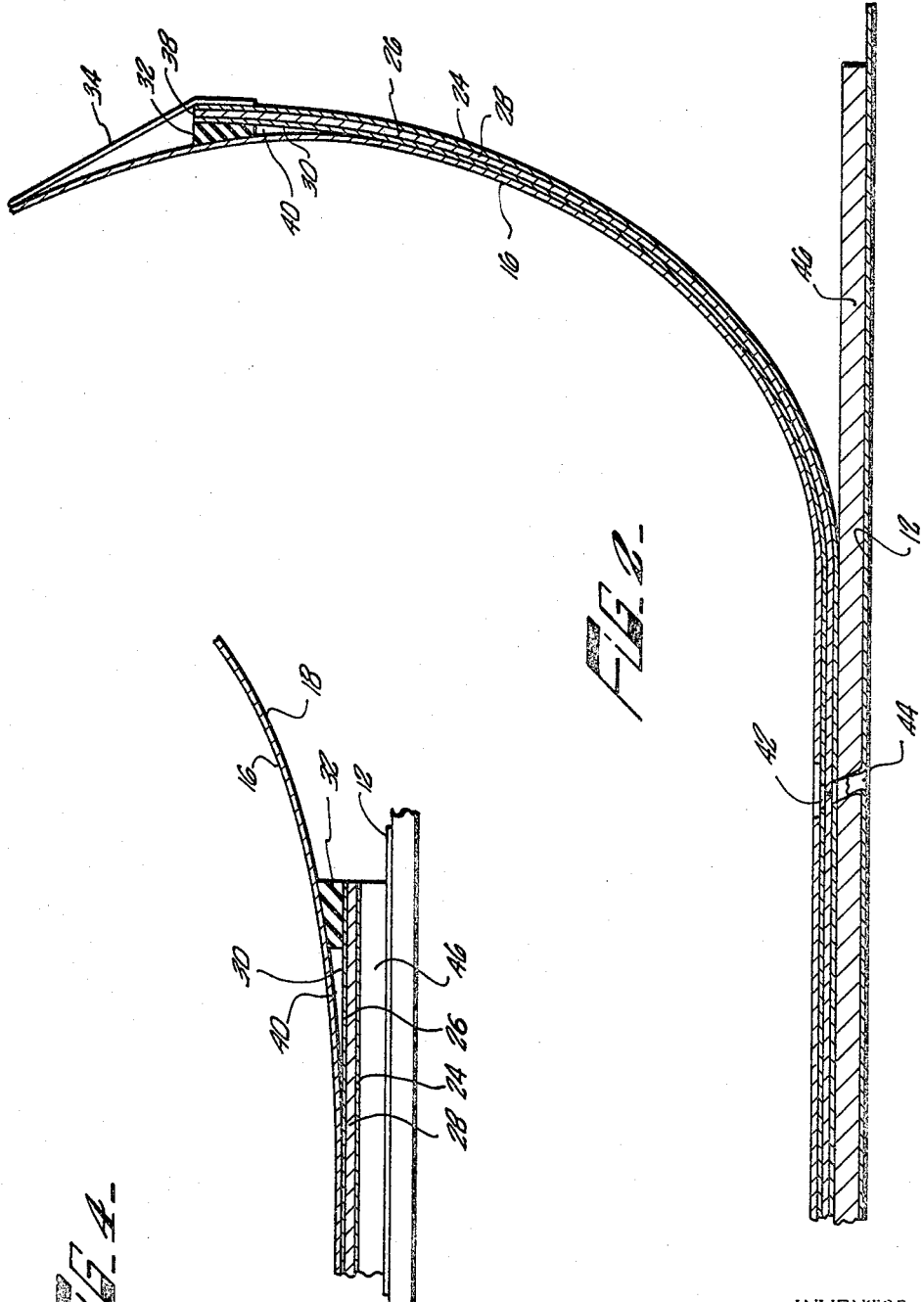

United States Patent Office

3,480,058
Patented Nov. 25, 1969

3,480,058
CONTAINER SAFETY WALL
George B. Harr, Pasadena, Calif., assignor to Air Logistics Corporation, Pasadena, Calif., a corporation of California
Filed Jan. 23, 1968, Ser. No. 699,954
Int. Cl. B65d 25/14, 25/34, 89/00
U.S. Cl. 150—.5
5 Claims

ABSTRACT OF THE DISCLOSURE

A container safety wall having a flexible liner, a sealant adjacent the liner and, preferably, a substantially parallel backing board adjacent another side of the sealant. The backing board is constructed of a resilient and flexible material which, when pierced by an object, does not deform beyond the hole caused by the passage of the object. The boards can be contoured about simply curved objects such as conventional collapsible storage tanks. The sealant material disposed between the liner and the backing board is such that the piercing object causes a cut, wound or slit which is smaller than the dimensions of the object.

The safety wall includes a seal strip between the wall of the container and the liner. The strip prevents escape of the contents of the tank from between the tank walls and the liner after the tank wall has been pierced. The safety wall is secured to the walls of the container by auxiliary straps or like means.

BACKGROUND OF THE INVENTION

Field of the invention

This invention relates to safety walls for use with liquid holding containers to prevent the uncontrolled escape of liquid therefrom after walls of the container have been pierced by an object. The safety wall can be used with collapsible as well as rigid tanks and containers.

State of the prior art

Generally speaking, liquid containers are quite vulnerable when being struck by high velocity objects such as a small arm's projectile or a fragment of an exploded shell. They pierce the walls of the container and permit liquid to escape therefrom. Loss of liquid may result in an explosion and a fire hazard. If the container is installed in a vehicle, loss of fuel stored in the container may deprive it of its power source.

Loss of the contents from large storage tanks can have serious economic and, where used by the military, logistic consequences. The latter is particularly acute under combat conditions. For example, military aircraft is frequently subjected to small arms fire which easily pierces its thin skin as well as walls of fuel containers inside the aircraft. A resulting fuel loss reduces the operating range of the aircraft which may be fatal, and causes a substantial fire and explosion hazard which can result in the ultimate destruction of the aircraft.

Where feasible, self-sealing fuel tanks are widely used by the military. They function effectively if the container or tank is in a rigid structure and supplemented by a backing board between the structure and the self-sealing fuel tank. In such instances the penetrating projectile causes a wound in the self-sealing tank wall which is substantially smaller than the size of the passing object. The tank wall is essentially tension free and the wound is therefore not pulled open. Lips of the wound remain aligned and the sealant can swell to close the opening and prevent fuel from escaping through the hole in the tank wall.

Collapsible, rubberized fabric tanks have been devised to supplement self-sealing fuel cells and to provide other useful functions. These rubberized fabric tanks have an attractive weight-to-capacity ratio and can be folded into small packages when empty.

These pillow-like tanks are employed in cargo bays of aircraft for the transport of fuel or for extending the aircraft's range. When filled to capacity, significant hoop stresses are present in the wall of the tank. If pierced by an object, the stresses cause a greatly enlarged hole in the wall of the tank. The resulting opening is many times greater than the size of the object which penetrated the wall. Liquid or fuel stored in the container is lost at a rapid rate. Swelling sealants applied to the walls of such a tank according to the prior art does not help. The sealant material itself is subjected to the stresses in the wall and it is pulled open with the wall. Presently known sealant materials are incapable of closing so large an opening in the wall.

Since collapsible rubberized fabric tanks are used in conjunction with military equipment, such as military aircraft, armor plate could provide a positive protection against small arms fire. The weight penalty, however, is a heavy burden and in many applications, particularly on aircraft, prohibitive. Thus, many vehicles, particularly military vehicles, operate without an effective protection against fuel loss after their tanks have been pierced by an object. Often the loss of fuel is almost instantaneous and might entail loss of the vehicle.

SUMMARY OF THE INVENTION

The present invention provides a safety wall for reducing or stopping the flow through a pierced hole in the wall of a container such as a fuel storage tank, for example. The container may be of the collapsible or rigid type. Briefly, the apparatus includes a flexible liner adjacent a portion of the wall of the container. A sealant material which swells when contacted by liquid stored in the container is disposed adjacent a side of the liner facing away from the tank wall.

In a preferred embodiment of this invention a sealing strip or means is disposed between the container wall and the liner, especially around the periphery of the liner. Liquid is thereby prevented from escaping between the liner and the container wall after the wall has been pierced by an object. Alternatively, the liner can be biased into engagement with smooth-walled containers to establish a seal through intimate contact between the two. To give the sealant structural strength and to protect it from accidental damage a backing board is preferably disposed adjacent the side of the sealant facing away from the liner.

The safety wall of this invention is placed adjacent those portions of the container wall which are vulnerable to being pierced by an object; in military operations to being pierced by small arms fire for example. In military aircraft these are the downwardly and sidewardly facing portions of the containers which are subjected to ground fire.

A projectile fired against the container first strikes the backing board, then the sealing means and the liner adjacent the container's wall. Thereafter it pierces the wall of the container and enters its interior. Liquid escapes through the opening pierced in the wall of the container and, if the safety wall is provided with the sealing strip, enters the small space between the container wall and the liner. The sealing strip prevents the escape of liquid through the space between the tank wall and the liner. Simultaneously the liquid enters the hole in the liner and contacts the sealant. The sealant swells, expands and thus reduces the size of the hole pierced through it which is the only path through which liquid can escape. The relatively small size of the hole enables the sealant to close it quickly. Liquid is now prevented from escaping past the sealant and into the surrounding atmosphere.

The safety wall of this invention is particularly well suited for use with collapsible storage tanks often found on military aircraft to increase their operating range or to transport fuel. These tanks are utilized in the cargo compartments of the aircraft's fuselage. If a projectile strikes the safety wall and enters the storage tank it will frequently rupture due to stresses in the wall and have an opening which is many times greater than the size of the projectile. The liner, however, isolates the stresses in as well as the rupture of the tank wall from the sealant. The hole in the sealant is substantially smaller than the size of the projectile because of the material's resiliency. Similarly, by selecting the proper materials, i.e. resilient materials, the size of the actual hole through the liner and the backing board do not exceed the size of the piercing object since they are isolated from the stresses in the tank wall.

To insure that the sealant material can properly swell the backing board is preferably constructed of a material which does not petal when pierced by an object. A petalling material is one in which its edges adjacent a pierced hole are permanently deformed in the direction of the piercing object. Fiber-reinforced resin sheets are ideally suited for this purpose. They have a favorable weight-to-stress ratio and are inert when contacting petroleum based fuels. If the backing board were constructed of a material which petals, such as metals for example, the swelling of the sealant to close the hole pierced through it is inhibited and full closure of the hole might be impossible.

If the container is a collapsible fuel tank supported by a metallic structure, such as an aircraft floor, a bay constructed of a nonpetalling, resilient material is preferably placed between the cover and the floor. Otherwise, petals from the pierced hole in the floor may project into the hole pierced through the backing board and the sealant material, thereby preventing the sealant from fully closing the pierced hole.

BRIEF DESCRIPTION OF THE DRAWINGS

FIG. 1 is a side elevational view of a collapsible storage tank provided with a safety wall constructed according to the present invention;

FIG. 2 is a rear elevational view, in section, taken along line 2—2 of FIG. 1;

FIG. 3 is a front elevational view of the storage tank shown in FIG. 1;

FIG. 4 is a fragmentary side elevational view, in section, taken along line 4—4 of FIG 3; and FIG. 5 is a fragmentary plan view of the storage tank shown in FIG. 1.

DESCRIPTION OF THE PREFERRED EMBODIMENTS

Referring first to FIGS. 1 and 5, a collapsible container or storage tank 10 is shown secured to a support 12 by means of a plurality of straps 14 which are disposed about the tank and engage suitable means (not shown) for engaging the support. The support is a pallet or floor, such as the floor of a compartment of an aircraft's fuselage, for example. The support may, of course, be part of any other vehicle or, alternatively, it may be a fixed support secured to the ground (not shown).

The container has an elongated, tubular configuration and a somewhat oblong cross-section (best seen in FIG. 3), which results from the deformation of tank walls 16 (shown in FIG. 3) under the weight of liquid (not shown) stored in the container. The weight of the liquid simultaneously subjects the container walls to tensional forces which tend to pull adjacent portions of the wall apart. The wall 16 of the container may be constructed of a rubberized fabric which is inert to petroleum-based fuels such as gasoline. Ends 18 and 20 of the container are closed and are integrally constructed with the longitudinal wall 16 to hold the liquid in the container.

Disposed about a portion of the container is a safety wall 22 comprising a backing board 24, a liner 26, and a sealant 28 disposed intermediate the two. All three are constructed of a flexible material such that they can flex about a longitudinal axis, have a substantially rectangular shape and a length about equal to the length of wall 16 of the container 10. A side 30 of the liner is disposed adjacent the wall of the container and includes a sealing strip 32 adjacent a periphery of the liner and extending toward the center of the liner. The strip is constructed of a material inert to the liquid in the container and, preferably it is bonded to side 30 to prevent any relative movement between it and the liner. A plurality of laterally spaced elongated straps 34 are secured to backing board 24, preferably adjacent long sides of the board, and are looped around that portion of the container which is not adjacent the safety wall 22. The straps 34 are provided with suitable buckles 36 to secure ends of the straps to each other and to flex the safety wall 22 about a longitudinal axis substantially parallel to a longitudinal axis of the container. The straps are tensioned by pulling them through the buckles which biases long sides 38 of the safety wall upwardly, as viewed in FIG. 3, and into engagement with the container wall 16. By applying a sufficient tensional force to the straps, the sealing strips 32 along the periphery of liner 26 frictionally engage the outside of the wall of the tank. A space 40 between the outside of container wall 16 and the side 30 of the liner is thereby sealed from the atmosphere surrounding the tank.

When an object, say a projectile (not shown) of a rifle (not shown), strikes the safety wall 22 and penetrates through it and through container wall 16 into the interior of the container 10, a hole 42 is pierced through both the safety wall and the container wall, as shown in FIG. 2. Through this hole liquid stored in the container escapes unless the hole is resealed. Since the container wall is under tension the piercing of the wall by the projectile results in a grossly enlarged hole. The size of the ruptured hole in the tank wall may be many times greater than the size of the projectile which penetrated into the interior of the container. At the same time the hole through the members of the safety wall, and particularly through the sealant 28, is no greater than the piercing object because stresses to which the tank wall is subjected have been isolated from the safety wall by the relatively loose, frictional engagement between the tank wall and the liner. By choosing the correct materials for the members of the safety wall, as more fully described hereinafter, the size of the actual hole therein can be maintained smaller than the size of the object that passed through. After the projectile has penetrated into the tank, liquid immediately escapes into the space 40 between the container and the liner and through hole 42 in the safety wall.

To close the hole 42 through the safety wall, the sealant 28 is constructed of a material which sustains only a small wound and which increases its volume when it comes into contact with the liquid escaping through the hole. The choice of the sealant material is therefore principally determined by the liquid which is being stored. As soon as the liquid contacts the sealant 28, the sealant begins to swell and expand. Since the sealant is in contact with both the liner and the backing board, it can only expand into the slit-like space of hole 42. As it expands, the size of hole 42 through the sealant becomes successively smaller until it is completely filled with the swelled sealant material. The escape path for the stored liquid is thereby effectively closed.

If the storage tank 10 is used for storing petroleum-based fuels, the sealant 28 is preferably constructed of styrene butadiene rubber, or butyl rubber, or of natural rubber, all of which exhibit the desired swelling characteristic when coming into contact with fuel. The rubber is preferably maintained at a low state of cure which is the commonly-used term for a completely cured but relatively soft rubber. As compared to highly-cured relatively hard rubber, soft rubber exhibits substantially better swelling characteristics when exposed to petroleum-based fuels. Its expanding action in hole 42 is substantially more rapid and the closure of the hole is more complete whereby essentially no fuel escapes therethrough shortly after the hole has been pierced by the projectile.

The sealant layer may additionally be reinforced either internally or on its surface with various types of fabric-like materials (not shown). The fabric layer may or may not be bonded to the rubber sealant. The fabric layer is generally incorporated during the process of sheeting-out or preparing the sealant layer. The use of fabric reinforcement in the sealant layer is to achieve improved performance and to facilitate handling of the sealant layer during fabrication.

The sealant 28 is preferably bonded to a side of the liner 26 facing away from the tank wall 16. Relative movements between the liner and the sealant are thereby minimized or prevented. It can further be bonded to the backing board to make the safety wall 22 is coherent unit, the components of which are immovable with respect to each other.

The backing board 24 is constructed of a nonpetalling material to facilitate the closure of the pierced hole 42. If the backing board were allowed to petal, as when it is constructed of a metal, petals of the pierced backing board extend into the hole 42 through sealant 28. The petals are relatively immovable and stiff and as the sealant swells in response to contacting the fuel in the container, it is prevented from fully closing the pierced hole since the petals project into the hole through the sealant. A continuous leak through the safety wall results.

Both the backing board and the liner are preferably constructed of a resilient material so that portions of the board and the cover adjacent hole 42 return to their original position after the projectile has passed through. If the material so returns, the effective size of the hole is reduced and its actual size may be substantially smaller than the size of the projectile. One such material comprises multiple layers of parallel fiberglass filaments each layer being oriented in a different direction, and which are bonded together by a resin. This material is sold under the trademark of "Stratoglas." It exhibits excellent characteristics for use in constructing the safety wall 22 of this invention. More particularly, when pierced by a projectile, portions of the fibers adjacent the periphery of the projectile passing through the sheet resiliently deflect in the direction of travel of the projectile. After the projectile has passed, these portions of the fibers return to their original position thereby reducing the actual size of the hole. The decreased hole size not only decreases the passageway for the liquid escaping therethrough, but in addition, supports the swelling sealant in the direction of flow of the escaping fuel and permits the sealant to more firmly seal off the pierced hole 42.

After the sealant 28 has sealed off the pierced hole, a small amount of fuel is disposed in space 40 between the tank and the liner since the pierced or ruptured hole in the container wall 16 remains open. The fuel, however, is prevented from escaping to the atmosphere surrounding the container by the sealing strips 32 secured to the side 30 of the liner 26. This seal is maintained by the elongated straps 34 which bias the safety wall towards the container wall 16. Even after a projectile pierced the flexible tank and the tank wall ruptured because it was substantial stresses, fuel or other liquid contained therein is prevented from escaping.

The safety wall permits the container wall 16 to work independently, i.e. it permits it to be ruptured without also rupturing the safety wall. While the opening in the container wall may be relatively large and difficult or impossible to seal with a sealant, a relatively small and clean hole is maintained in the safety wall which can be resealed by the swelling of sealant 28. At the same time, the safety wall provides support for the now ruptured container wall and prevents it from further rupturing. Since all components of the safety wall are immovable with respect to each other, the hole pierced by the projectile through the backing board, the sealant, and the liner remains aligned and can be resealed by the sealant.

In an alternative embodiment of this invention the sealing strips 32 may be eliminated. A direct seal between the container wall 16 and the liner 26 is then established by virtue of external banding. This embodiment is particularly well suited for applications in which the tank walls are smooth and rigid and are of relatively simple shapes.

The safety wall of this invention is secured to the container 10 such that it protects those portions of the container most likely to be struck by a piercing object. If the container is installed on an aircraft, the safety wall is disposed about the lower half of it. Projectiles fired at the aircraft from the ground thereby have to pass through the safety wall before they can pierce the container wall 16. Since only such projectiles can only strike at the lower half any leaks from striking projectiles are sealed off and loss of fuel with the resulting danger to the aircraft is substantially reduced.

A projectile entering the container from the lower side must also pass through the support 12, for example, through the floor of an aircraft compartment. The projectile must therefore pierce the support. If, as is commonly the case, the support is constructed of metal, say sheet aluminum, the edges of hole 44 pierced through the support are deflected or petalled in the direction of the flight of the projectile. If the safety wall 22 is in direct contact with the support, the petals can extend into hole 42 in the safety wall. Such petals not only prevent the fringes of the backing board adjacent the hole from returning into their original position after the projectile has passed therethrough, but can also prevent the sealant 28 from fully closing hole 42 as described above. A base 46 constructed of a resilient, nonpetalling material is therefore interposed between the outside of the safety wall and the support 12. This spaces the safety wall from the support an amount sufficient to prevent the petalled edges of the support 12 from entering hole 42 in the safety wall. The thickness of the base varies with the thickness of as well as with the type of material of which the support is constructed. If the storage tank is disposed on an average aircraft floor, a base thickness of about three-quarters of an inch is normally sufficient to prevent petals from interfering with the sealing action of the safety wall. A particularly useful base support consists of a bidirectional corrugated resin reinforced fiberglass material available on the market under the trademark "Mo-Mat" and produced by the Air Logistics Corporation of Pasadena, Calif. This material is highly resilient, nonpetalling, strong, and light in weight.

When not in use, the safety wall can be removed from the storage tank, laid flat, and rolled into a small and easily transported package. Moreover, it is lightweight, a safety wall protecting an auxiliary aircraft tank holding 3,000 gallons weighing no more than about 400 pounds. It is, therefore, ideally suited for use in conjunction with aircraft where light weight is required and for military purposes in general where ease of installation, as well as ease of transportation, is of prime importance.

I claim:
1. A self-sealing storage container for a liquid comprising:
 (a) a collapsible container constructed of a flexible material;
 (b) a flexible liner disposed adjacent at least a portion of the container;
 (c) a flexible backing board of multiple layers of resin-bonded parallel filaments, the orientation of the filaments in one layer being different from the orientation of the filaments in a next adjacent layer;

(d) a sealant layer of a material which increases in volume responsive to contact with the liquid disposed intermediate and in contact with the backing board and the liner; and (e) means for securing the backing board to the container to establish a seal between the liner and the container.

2. Apparatus according to claim 1 including second sealing means intermediate the liner and the container for sealing a space between the liner and the container from the surrounding atmosphere, and wherein the securing means bias the second sealing means into contact with the container.

3. Apparatus according to claim 1 wherein the liner and the backing board are disposed intermediate the container and a structure supporting the container and including a base constructed of a material which does not petal when pierced by an object disposed between the backing board and the structure.

4. Apparatus for reducing a flow-rate through a pierced hole in a wall of a container having a liquid stored therein, the apparatus comprising:

(a) a flexible liner adapted to be placed adjacent a portion of the wall of the container;

(b) a sealing strip secured to a side of the liner facing the tank wall adjacent a periphery of the liner and extending toward a center of the liner;

(c) a flexible backing board constructed of a material which does not petal when pierced by an object, the backing board having a configuration similar to that of the liner and being spaced apart from a side of the liner facing away from the tank wall;

(d) sealing means constructed of a material which increases its volume in response to contacting the liquid intermediate the liner and the backing board; and (e) means including a plurality of straps engaging the backing board for biasing the liner toward the tank wall such that the sealing strip seals a space intermediate the liner and the tank wall from the atmosphere.

5. Apparatus according to claim 4 wherein the backing board is constructed of a material including lamina of fiberglass filaments bonded by a resin.

References Cited

UNITED STATES PATENTS

| | | | |
|---|---|---|---|
| 2,391,477 | 12/1945 | Phillips | 150—0.5 |
| 2,401,626 | 6/1946 | Eger. | |
| 2,421,613 | 6/1947 | Gray. | |
| 2,437,058 | 3/1948 | Waters | 150—52 X |
| 2,672,902 | 3/1954 | Prager | 150—0.5 |

GEORGE E. LOWRANCE, Primary Examiner

U.S. Cl. X.R.

150—52; 220—63